March 13, 1934.   M. TIBBETTS   1,950,888
VIBRATION DAMPER
Filed Oct. 5, 1931
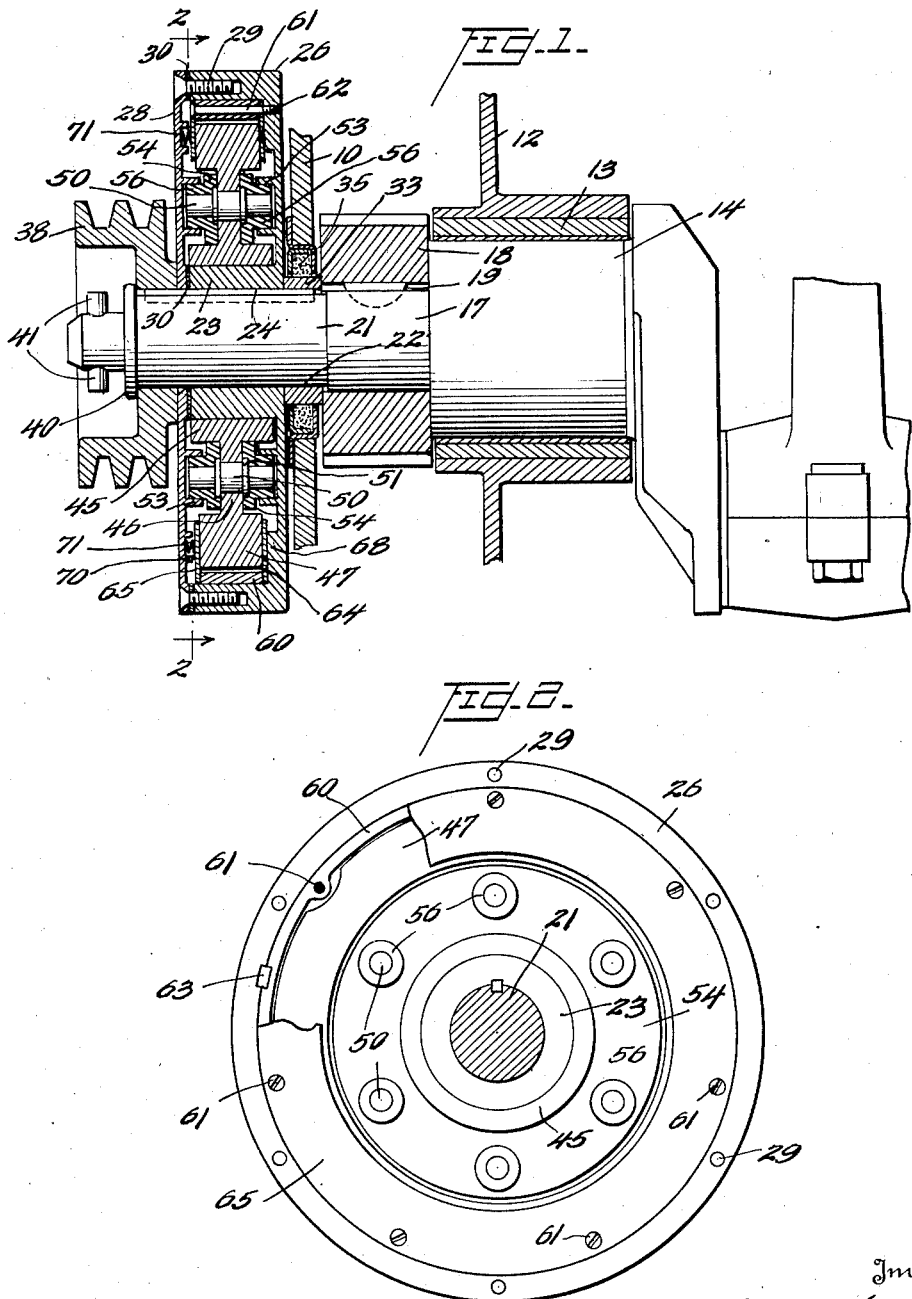
Inventor
Milton Tibbetts,
By
Attorneys Patented Mar. 13, 1934

1,950,888

UNITED STATES PATENT OFFICE 1,950,888

VIBRATION DAMPER

Milton Tibbetts, Detroit, Mich., assignor to Packard Motor Car Company, Detroit, Mich., a corporation of Michigan Application October 5, 1931, Serial No. 567,007

4 Claims. (Cl. 74—6)

This invention relates to internal combustion engines and more particularly to means for controlling torsional vibration in the crankshafts of such engines.

It is common practice to damp torsional vibrations in a crankshaft by the provision of means for absorbing the energy of vibrations occurring in the shaft, such means consisting primarily of one or more inertia masses adapted for movement with respect to the shaft on the occurrence of vibration, and a resilient and frictional connection between these inertia masses and the shaft, these elements being arranged to provide a unitary assembly adapted for mounting on or adjacent the forward end of the shaft. In this location the damper is exposed to some extent to water and oil, the latter being particularly harmful in the event that rubber is used as the resilient or energy absorbing material. Furthermore, in dampers employing cooperating friction surfaces for resisting relative movement of the inertia mass and the crankshaft, the presence of oil or water will frequently render the damper ineffective by altering the degree of resistance offered by the cooperating friction surfaces.

It is therefore an object of the invention to provide a unitary fluid-tight damper in which the essential elements are completely enclosed within a casing.

A further object of the invention is the provision of a vibration damper consisting of a fluid-tight casing adapted to be mounted for rotation with the shaft, inertia means supported within said casing for movement with respect thereto, and energy absorbing means interposed between said inertia member and said casing within the latter.

A more specific object of the invention is the provision of an annular casing adapted to be keyed to the forward end of a crankshaft or an extension thereof, movable inertia means within the casing, and connections between the inertia means and the casing including a rubber element and cooperating friction surfaces moving with the casing and the inertia means, the whole comprising a unitary fluid-tight vibration damper.

Further objects of the invention will be apparent from the following description taken in connection with the accompanying drawing, in which:

Figure 1 is a longitudinal vertical section through the part of an internal combustion engine provided with a vibration damper constructed according to the principles of this invention; and Figure 2 is a sectional view substantially on the line 2—2 of Figure 1.

Referring now more specifically to the drawing, it will be observed that the reference numeral 10 in Figure 1 designates a portion of the crank case of an internal combustion engine, the crank case being provided with the conventional transverse webs, such as shown at 12, the latter supporting suitable aligned bearings 13 for an engine crankshaft 14.

Forwardly of the first bearing 13, the crankshaft 14 is preferably formed with a reduced portion 17, on which a gear or chain sprocket 18 may be keyed or otherwise secured, as indicated at 19, and used to drive the engine cam shaft or other engine accessories, which are not shown in the drawing. Forwardly of the sprocket 18, the crankshaft is preferably further reduced in size, as shown at 21, and projects through a suitable opening 22 in the front wall of the crank case 10.

The damping means of this invention is illustrated as mounted at or adjacent the end of the crankshaft 14. It comprises a casing 26 having a supporting portion or hub 23 keyed or otherwise rigidly secured to the crankshaft on the reduced portion 21 thereof, as indicated at 24. The casing 26 is formed to provide an annular chamber within which the remaining elements of the damper may be mounted, this chamber being completely closed and sealed against the entrance of fluid by a cover plate 28 which may be secured to the casing 26 by bolts 29 passed through the cover plate and threaded into the annular hub and peripheral portions of the casing, annular packing rings 30 being preferably inserted between the contacting portions of these elements.

A spacing ring 33 is mounted on the reduced portion 21 of the crankshaft between the casing 26 and the gear 18 to resist axial movement of the casing and associated parts in one direction, this spacing ring cooperating with a packing device 35 mounted in the opening 22 of the crank case to prevent leakage of lubricant from the crank case. On the other side the casing 25 may be retained in position by a member 38, preferably a pulley adapted to drive the engine cooling fan or other engine accessories, not shown, this retaining member engaging the cover plate 28 and being held in position on the reduced portion 21 of the shaft by means of a nut 40 threaded on the end of the shaft and formed with suitable pins or lugs 41 for engagement with the usual hand starting crank whereby the shaft may be manually rotated for starting.

It will be observed from the description thus far given that the damper consists of an enclosed annular casing forming a complete unitary device adapted to be slipped on the end of the shaft and keyed thereto and retained in position by means customarily fitted on the forward end of the crankshaft. The preferred arrangement of the remaining parts of the damper within the casing 26 will now be specifically described.

An annular inertia member provided with a bearing portion 45 is rotatably mounted on the hub portion 23 of the casing, this inertia member having a radially extending web portion 46 and an enlarged annular rim portion 47, the latter being of such dimensions and arranged at such distance from the axis of the shaft that the inertia member will rotate at substantially constant speed. Thus when vibrations occur in the shaft, relative movement of the shaft and the inertia member will result by reason of the substantial inertia effect of the rim portion 47 of the inertia member. The inertia of this relative movement may be absorbed by a resilient or a frictional connection between the inertia member and the casing, the preferred form of the invention including connections of both types.

It will be observed that the web portion 46 of the inertia member is drilled to receive pins 50 projecting laterally of the web on each side thereof and retained against lateral displacement by upset portions 51. A plurality of these pins is provided, substantially equally spaced about the web portion of the inertia member as shown in Figure 2.

The oppositely disposed projecting ends of the pins 50 extend into corresponding cup-shaped projections 53 on the casing 26 and the cover plate 28, these projections being preferably formed integral with the respective parts. Disposed about the hub member 45 on each side of the web portion 46 of the inertia member is an annular ring 54 of elastically deformable material such as rubber, or any other suitable material which is subjected to a considerable hysteresis loss when put through a cycle of compression and expansion. This rubber member 54 constitutes the hysteresis damping member and is provided at spaced intervals with circular projections or knobs 56, which are adapted to surround and tightly embrace the projecting ends of the pins 50 and to fit snugly within the cup-shaped projections 53 formed on the casing 26 and cover plate 28 respectively. The annular rings 54 may conveniently be secured to the inertia member and to the pins 50 by being vulcanized thereto, and thus the inertia member and the annular rings may be formed as a complete unit and readily assembled in the casing 26 with the circular projections 56 on the annular ring extending within the corresponding cup-shaped projections on the casing. Similarly the cover plate 28 may be subsequently assembled with the cup-shaped projections thereon embracing the corresponding circular projections on the adjacent annular ring.

It will be evident that upon relative movement between the inertia member and the casing, a portion of the annular rubber members 54 will be forced to partake of the movement of the inertia member by reason of the connection with the web portion 46 of the inertia member and the pins 50, while other portions of these rubber members will be constrained to move with the casing since they are fitted within the projections 53 on the casing 26 and cover plate 28. It is thus obvious that these rubber members will be considerably distorted upon the occurrence of torsional vibration in the crankshaft, and considerable energy will be absorbed by hysteresis or internal friction in the rubber with resultant damping of the shaft vibrations.

The annular rubber members 54, being possessed of considerable resilience, will also continue to exert a force tending to return the inertia member to its neutral position with respect to the casing and shaft, thus acting to restore the device to its original condition after any displacement thereof resulting from vibration of the shaft. It will be observed that by reason of the tight fit of the casing and cover plate, these rubber members will be completely protected from moisture and oil tending to the deterioration of the rubber.

As hereinbefore mentioned, mechanical friction between relatively moving friction surfaces is also preferably provided to assist in the absorption of energy resulting from vibration in the shaft. This mechanical friction means may be carried by the casing and arranged to engage the rim portion 47 of the inertia member which partakes of the greatest amplitude of motion with respect to the shaft and the casing when vibrations occur. For this purpose annular friction discs 64 and 65 are positioned on either side of the rim portion 47 of the inertia member, these friction discs being secured to the casing 26. An annular member 60, fitted within the peripheral portion of the casing 26 and preferably keyed thereto as shown at 63, is drilled at spaced intervals to receive a plurality of bolts 61 threaded into the casing at 62, the friction disc 65 being clamped against one side of the annular member 60 by the heads of the bolts 61 and the friction disc 64 being clamped against the member 60 at its opposite side between this member and an annular boss 68 formed on the inner wall of the casing 26 adjacent the periphery thereof. In order to increase the friction between the plates 64 and 65 and the rim portion 47 of the inertia member, the cover plate 28 may be provided with a plurality of circumferentially spaced cup-shaped projections 70 within which are set the coil springs 71 bearing against the friction disc 65.

Thus, on the occurrence of vibrations in the shaft, the resulting relative movement of the inertia member and the casing will develop considerable mechanical friction between the plates 64 and 65 and the rim portion 47 of the inertia member which will be dissipated in the form of heat, and thus the energy of the vibrations will be absorbed. The construction is such that the friction surfaces are completely protected from moisture, dirt, oil, and other foreign matter which might affect their friction value since the entire damper is enclosed within the fluid-tight casing.

It will be appreciated that various changes in the details of construction described herein for the purpose of illustrating the invention may be made without departing from the spirit of the invention and that such alterations and modifications are contemplated as fall within the spirit and scope of the appended claims.

Having thus described the invention, what is claimed as new and desired to be secured by Letters Patent is:—

1. In a vibration damper for a rotatable shaft, the combination with a fluid-tight annular casing adapted to be mounted on said shaft and secured to said shaft for rotation therewith, of inertia means mounted within said casing for oscillatory movement with respect thereto, elastically deformable energy absorbing means within said casing and interposed between said casing and said inertia means to resist relative oscillatory movement of said inertia means, and a friction connection between said inertia means and said casing.

2. In a vibration damper for a crankshaft, the combination with a fluid-tight casing adapted to be connected to the crankshaft for rotation therewith, of inertia means mounted within said casing for rotative movement with respect thereto, means including rubber interposed between said casing and said inertia member for resisting relative rotative movement of the latter, and energy absorbing friction devices having engaging surfaces moving with the casing and with the inertia member.

3. A vibration damper for a crankshaft comprising an annular fluid-tight casing having a hub member adapted to be mounted on the shaft, an annular inertia mass rotatably supported on said hub member within said casing, a rubber energy absorbing element, means constraining portions of said element to move with said inertia mass and with said casing, whereby energy of vibrational movement imparted to said inertia mass is absorbed by deformation of the rubber element, and a friction connection between said inertia mass and said casing.

4. In a vibration damper for a crankshaft, the combination with a fluid-tight casing adapted to be connected to the crankshaft for rotation therewith, of inertia means mounted within said casing for rotative movement with respect thereto, means including rubber interposed between said casing and said inertia member for resisting relative rotative movement of the latter, energy absorbing friction devices having engaging surfaces moving with the casing and with the inertia member, and resilient means associated with said devices for increasing the friction developed thereby.

MILTON TIBBETTS.